United States Patent [19]
Anzel

[11] Patent Number: 5,826,831
[45] Date of Patent: Oct. 27, 1998

[54] SATELLITE CO-LOCATION METHODS

[75] Inventor: Bernard M. Anzel, El Segundo, Calif.

[73] Assignee: Hughes Electronics, Los Angeles, Calif.

[21] Appl. No.: 701,513

[22] Filed: Aug. 22, 1996

[51] Int. Cl.⁶ .................................................. B64G 1/26
[52] U.S. Cl. .......................................... 244/169; 244/164
[58] Field of Search .............................. 244/158 R, 164, 244/165, 169, 172, 3.22

[56] References Cited

U.S. PATENT DOCUMENTS

| | | | |
|---|---|---|---|
| 5,020,746 | 6/1991 | Anzel | 244/169 |
| 5,443,231 | 8/1995 | Anzel | 244/164 |

*Primary Examiner*—Galen L. Barefoot
*Attorney, Agent, or Firm*—Terje Gudmestad; M. W. Sales

[57] ABSTRACT

A geostationary orbital box is divided by radially-oriented planes to form orbital sub-boxes. A thruster system facilitates station keeping satellites in each of these orbital sub-boxes. The thruster system includes thruster pairs that are positioned on an anti-nadir face of each satellite and directed through the satellite's center of mass. In addition, multiple satellites can be stationed in each of the sub-boxes by causing them to rotate in a chosen one of a clockwise and a counterclockwise direction and to be spaced from each other in at least one of a radial direction and a normal direction. To enhance the fine-grain control of each of the satellites, the thruster system preferably uses ion-propulsion thrusters.

10 Claims, 5 Drawing Sheets

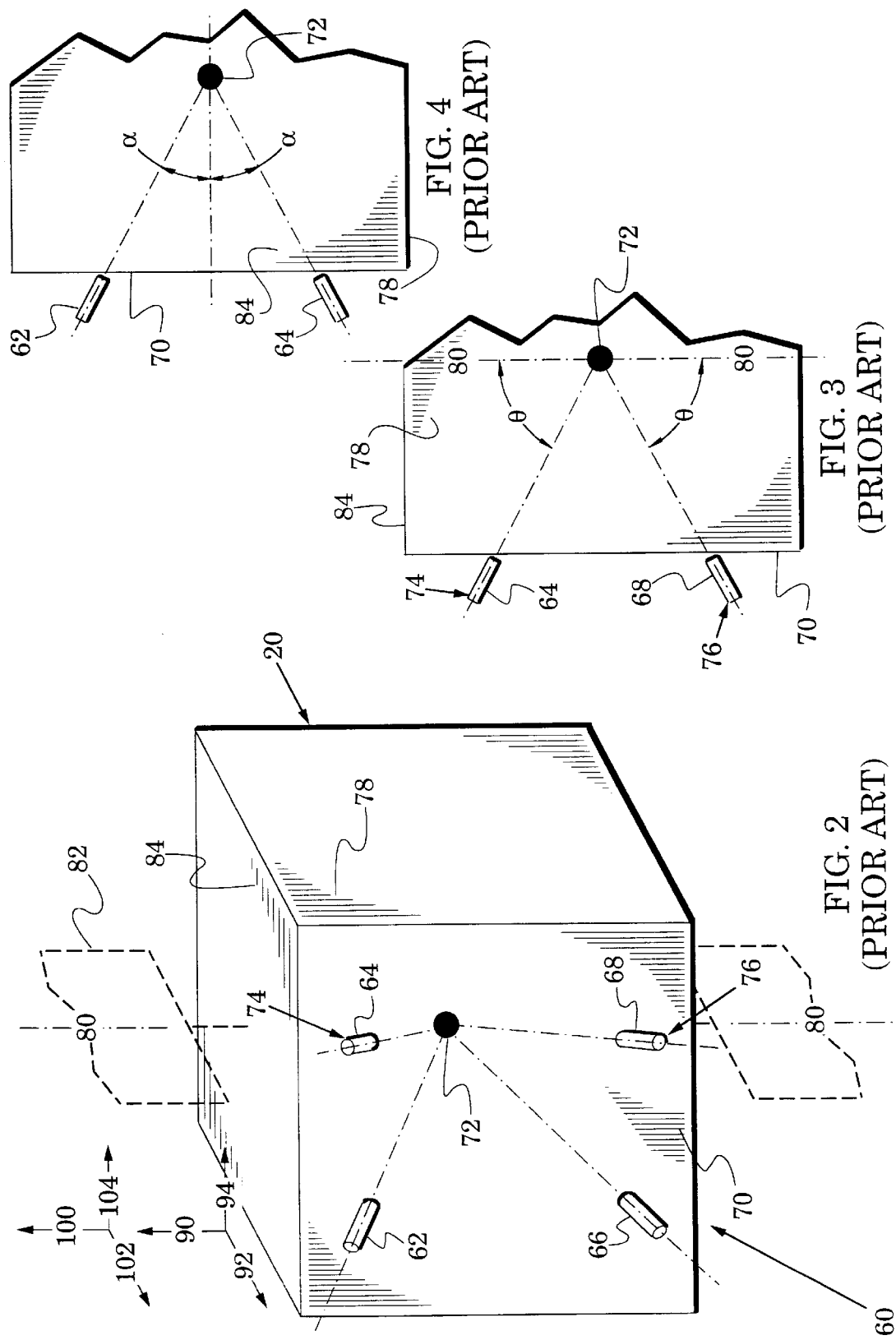

SATELLITE CO-LOCATION METHODS

BACKGROUND OF THE INVENTION

1. Field of the Invention

The present invention relates generally to geosynchronous satellites and more particularly to satellite station keeping.

2. Description of the Related Art

FIG. 1 shows a satellite 20 in a geosynchronous orbit (GEO) 22 about the Earth 24. The satellite 20 has an orbital period equal to the Earth's rotational period and an orbital plane which is coplanar with the Earth's equator 26. Consequently, the satellite's position appears fixed to all Earth stations, e.g., the stations 30 and 32, that can view the satellite. Because of this feature, GEO satellites are particularly useful in establishing communication links, e.g., the links 34 and 36, between such stations. These stations can also be linked to stations that cannot view the satellite 20, e.g., stations on the other side of the Earth, if the satellite has communication links to other GEO satellites, e.g., the link 38 to the satellite 40 which has a link 42 to an Earth station.

Unfortunately, a GEO satellite is exposed to forces which act to move it from its GEO orbit. These forces are generated by a variety of sources which include the gravity of the sun and the moon, the Earth's elliptical shape (triaxiality) and solar radiation pressure. The act of countering these forces to maintain the satellite in its GEO orbit is typically referred to as station keeping.

Station keeping requires control over the satellite's inclination, eccentricity and drift wherein inclination refers to a tilt of the satellite's orbital plane from the Earth's equatorial plane, eccentricity refers to orbital variations in the satellite's altitude, and drift refers to the satellite's average east-west location (longitude).

Station keeping has been accomplished in many GEO satellites with different sets of thrusters that are aligned in north-south and east-west directions. The north-south thrusters produce north-south velocity changes ($\Delta V$) to control inclination. The east-west thrusters produce an east-west $\Delta V$ to control eccentricity and drift. Because these thrusters are typically not directed through the satellite's center of mass, they must be fired in pairs which cancel each other's applied torque upon the satellite.

A different thruster system was described in U.S. Pat. No. 5,443,231 which issued Aug. 22, 1995 to Bernard Anzel and was assigned to Hughes Electronics, the assignee of the present invention. As shown on the satellite 20 in FIG. 2, this thruster system 60 includes four thrusters 62, 64, 66 and 68 which are carried on the satellite's anti-nadir face 70 (a satellite's nadir face is the face directed towards the Earth).

The thrusters are arranged so that their thrust is directed through the satellite's center of mass 72. Northwest and northeast thrusters 62 and 64 form a north thruster pair 74 and southwest and southeast thrusters 66 and 68 form a south thruster pair 76. As particularly illustrated in the FIG. 3 view of the east face 78, the thruster pairs 74 and 76 are each canted away from the north-south axis 80. Preferably they are canted by the same angle $\theta$. The pairs are preferably positioned as close as possible to the north and south ends of the anti-nadir face 70 to reduce the angle $\theta$ (an exemplary angle is 45°) and, therefore, the cosine loss of thrust along the north-south satellite axis 80 (solar wings 82 typically rotate about this north-south axis).

As shown in the FIG. 4 view of the north face 84, thrusters 62 and 66 are laterally separated from thrusters 64 and 68 and each of these pairs is slewed about the north-south axis 80. Preferably they are slewed by the same angle $\alpha$. The slew angle $\alpha$ is selected to be large enough (e.g., 10–12°) to control the satellite's eccentricity (when it's position is disturbed by, for example, solar radiation pressure).

The position of the satellite 20 is typically described with reference to three orthogonal component vectors of latitude 90, radius 92 and longitude 94 that are shown in FIG. 2. Control thrusts applied by the thruster system 60 causes velocity changes which are described in terms of three orthogonal $\Delta V$ components of normal 100, radial 102 and tangential 104 which are also shown in FIG. 2. Because they are directed through the satellite's center of mass 72, each of the thrusters 62, 64, 66 and 68 can generate normal, tangential, and radial $\Delta V$ components in the satellite 20.

In an exemplary control process illustrated in FIG. 5, north-south corrections are applied by the thruster system (60 in FIG. 2) to control inclination errors of the satellite 20. Most satellite inclination errors (caused, for example, by sun/moon gravity effects) occur along an axis 108 connecting an orbit ascending node 110 and an orbit descending node 112 which are respectively located at ~90° R.A. and ~270° R.A. (R.A. is right ascension which is an angle measured in the equatorial plane between the satellite and a reference position of the sun at vernal equinox).

These inclination errors generally are positive at the orbit ascending node 110 and negative at the orbit descending node 112. Accordingly, the north thruster pair (74 in FIG. 2) is fired in the region of the orbit ascending node 110 and the south thruster pair (76 in FIG. 2) is fired in the region of the orbit descending node 112. These firings occur in firing arcs 114 and 116 and generate normal $\Delta V$ components to facilitate control of the satellite's inclination. The thrusters of each thruster pair can be fired together or, alternatively, the northwest thruster 62 and northwest thruster 64 can be respectively fired before and after the orbit ascending node 110 and the southwest thruster 66 and the southeast thruster 68 can be respectively fired before and after the orbit descending node 112.

If the firing durations of the north and south thruster pairs 74 and 76 are equal, they do not produce a net radial $\Delta V$ component and, consequently, one of the two orthogonal components of orbital eccentricity is unchanged. However, these inward-directed radial components generally do produce an unwanted eastward drift component.

The north thrusters 62 and 64 respectively produce positive and negative $\Delta V$ tangential components. Similarly, the south thrusters 66 and 68 respectively produce positive and negative $\Delta V$ tangential components. Tangential $\Delta V$ components can thus be generated by causing the firing durations of the thrusters 62 and 64 to differ from each other (in the region of the orbit ascending node 110) and/or by causing the firing durations of the thrusters 66 and 68 to differ from each other (in the region of the orbit descending node 112).

These tangential $\Delta V$ components facilitate control of satellite eccentricity errors along the coordinate axis 108. These tangential $\Delta V$ components also facilitate correction of satellite drift errors (caused, for example, by triaxiality effects and the aforementioned eastward drift).

In addition, radial $\Delta V$ components can be generated by causing the firing duration of the thruster pair 74 in the region of the orbit ascending node to differ from the firing duration of the thruster pair 76 in the region of the orbit descending node 112. These radial components facilitate control of satellite eccentricity errors along a coordinate axis 118 which is orthogonal to the axis 108.

Thus, firings of the thrusters 62 and 64 in the region of the orbit ascending node 110 and firings of the thrusters 66 and 68 in the region of the orbit descending node 112 can generate normal, radial and tangential ΔV components to correct satellite inclination and drift errors and two orthogonal components of satellite eccentricity errors (caused, for example, by solar radiation pressure).

The required normal ΔV component for controlling inclination errors can be expressed as $\Delta V_{IN}$ and the required tangential ΔV component for controlling drift errors can be expressed as $\Delta V_{DT}$. Similarly, the required tangential ΔV component for controlling eccentricity errors along the coordinate axis 108 can be expressed as $\Delta V_{ET}$ and the required radial ΔV component for controlling eccentricity errors along the coordinate axis 118 can be expressed as $\Delta V_{ER}$. Because radial ΔV components and tangential ΔV components are trigonometrically related to normal ΔV components by the cant angle θ and the slew angle a, these required control components can be expressed in terms of normal ΔV components at each of the thrusters (62, 64, 66 and 68 in FIG. 2). These expressions were shown in U.S. Pat. No. 5,443,231 to be:

$$\Delta V_{N62} = \frac{1}{2} \left\{ \left[ \frac{\Delta V_{DT} + \Delta V_{ET}}{2\tan\theta\tan\alpha} \right] + \left[ \frac{\Delta V_{IN} - \Delta V_{ER}}{2\tan\theta} \right] \right\},$$

$$\Delta V_{N64} = \frac{1}{2} \left\{ \left[ \frac{\Delta V_{DT} + \Delta V_{ET}}{-2\tan\theta\tan\alpha} \right] + \left[ \frac{\Delta V_{IN} - \Delta V_{ER}}{2\tan\theta} \right] \right\},$$

$$\Delta V_{N66} = \frac{1}{2} \left\{ \left[ \frac{\Delta V_{DT} - \Delta V_{ET}}{2\tan\theta\tan\alpha} \right] + \left[ \frac{\Delta V_{IN} + \Delta V_{ER}}{2\tan\theta} \right] \right\},$$

and $$\Delta V_{N68} = \frac{1}{2} \left\{ \left[ \frac{\Delta V_{DT} - \Delta V_{ET}}{-2\tan\theta\tan\alpha} \right] + \left[ \frac{\Delta V_{IN} + \Delta V_{ER}}{2\tan\theta} \right] \right\};$$

wherein a thruster firing duration $T_p$ for each thruster is given by the equation $$T_p \approx \frac{2}{\omega_\epsilon} \sin^{-1}\left[ \frac{\omega_\epsilon}{2} \left( \frac{M\Delta V_N}{F\cos\theta} \right) \right]$$

which is expressed in terms of earth rate $\omega_\epsilon$, spacecraft mass M, engine thrust F and the normal ΔV component for that thruster as shown above.

U.S. Pat. No. 5,443,231 further taught that complete orbit control can still be maintained in the event of a thruster failure. In this case, the thruster located diagonally from a failed thruster is inactivated and control thrusts are generated by the remaining diagonal pair. The firings of the remaining thrusters at the ascending node 110 and the descending node 112 can control inclination and drift errors by increasing, e.g., doubling, the firing time duration. However, the control of eccentricity will be in error.

This eccentricity error, in conjunction with the error caused by the solar radiation pressure, is corrected by firing each of the remaining thrusters at a third orbital location. As shown in FIG. 5, a location 120 in the region of 180° R.A. is used if the remaining thrusters are thrusters 62 and 68 and a location 122 in the region of 0° R.A. is used if the remaining thrusters are thrusters 64 and 66. At the third location, each remaining thruster is fired equally for a duration which is approximately ⅓ of that at the ascending and descending nodes 110 and 112).

In the firing at either the location 120 or the location 122, the thrusters will generate equal but opposite normal and tangential ΔV components. However, they will generate additive radial ΔV components to correct the eccentricity errors.

Orbital "boxes" on the GEO orbit (22 in FIGS. 1 and 5) are assigned to communication customers. The tangential dimension of these boxes is generally on the order of 0.2° longitude or ~147 kilometers at synchronous radius. The normal and radial dimensions of each orbital box are also on the order of 147 kilometers. Because the number of GEO boxes is obviously limited and communication demands constantly increase, there is increasing commercial pressure to locate more than one satellite in an orbital box, i.e., an increasing pressure to co-locate n satellites in a single orbital box.

Although the teachings of U.S. Pat. No. 5,443,231 provide methods of station keeping with a simple system of four thrusters on a satellite's anti-nadir face, it does not address station keeping methods for co-location of multiple satellites.

Various ways of co-locating multiple satellites in a single geosynchronous orbital box have previously been proposed. These satellites typically use relatively large thruster levels for satellite station keeping and, therefore, require intersatellite phasing of maneuvers to achieve safe separation distances. This results in cumbersome ground operations which are further exacerbated when the number of satellites are increased or when human errors occur.

SUMMARY OF THE INVENTION

The present invention is directed to the co-location of multiple satellites in a single geosynchronous orbital box. In particular, it adapts the precise thruster systems and methods of U.S. Pat. No. 5,443,231 to achieve safe separation distances between co-located satellites, each of which is controlled independently from the others which thereby greatly simplifies ground operations.

In one co-location method embodiment, an orbital box is longitudinally divided along at least one radially-oriented plane to form a plurality of orbital sub-boxes and the thruster methods of U.S. Pat. No. 5,443,231 are used to station keep at least one satellite within each of the orbital sub-boxes.

In an extension of this method, multiple satellites are maintained in at least one of the sub-boxes by directing them in a chosen one of a clockwise direction and a counterclockwise direction when the respective sub-box is viewed tangentially and by spacing each of the satellites in at least one of a radial direction and a normal direction from the other satellites of that orbital sub-box.

The teachings of the invention are preferably practiced with ion-propulsion thrusters whose low thrusts and high specific impulses facilitate a fine-grained and efficient control of satellite drift, eccentricity and inclination errors. With these thrusters, the firings of the invention are preferably performed daily to facilitate a small tangential dimension of the orbital sub-boxes, e.g., ~36.8 kilometers (4 sub-boxes in FIG. 6) and even as small as ~14.7 kilometers (10 sub-boxes in FIG. 6).

The novel features of the invention are set forth with particularity in the appended claims. The invention will be best understood from the following description when read in conjunction with the accompanying drawings.

BRIEF DESCRIPTION OF THE DRAWINGS

FIG. 2 is an enlarged view of one of the satellites of FIG. 1 which illustrates a thruster system;

FIG. 3 is a view of an east face of the satellite of FIG. 2;

FIG. 4 is a view of a north face of the satellite of FIG. 2;

DETAILED DESCRIPTION OF THE PREFERRED EMBODIMENTS

Figure 1:
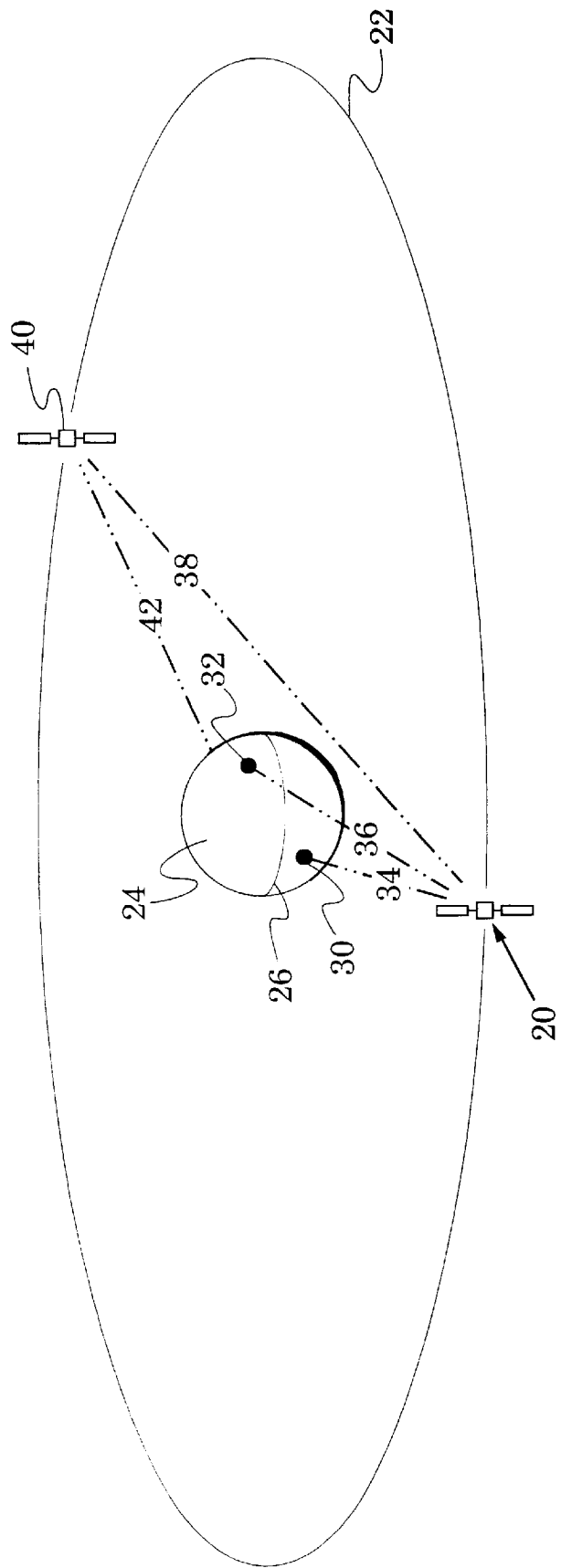
FIG. 1 is a perspective view of the Earth and a plurality of satellites in geosynchronous orbit.
Figure 5:
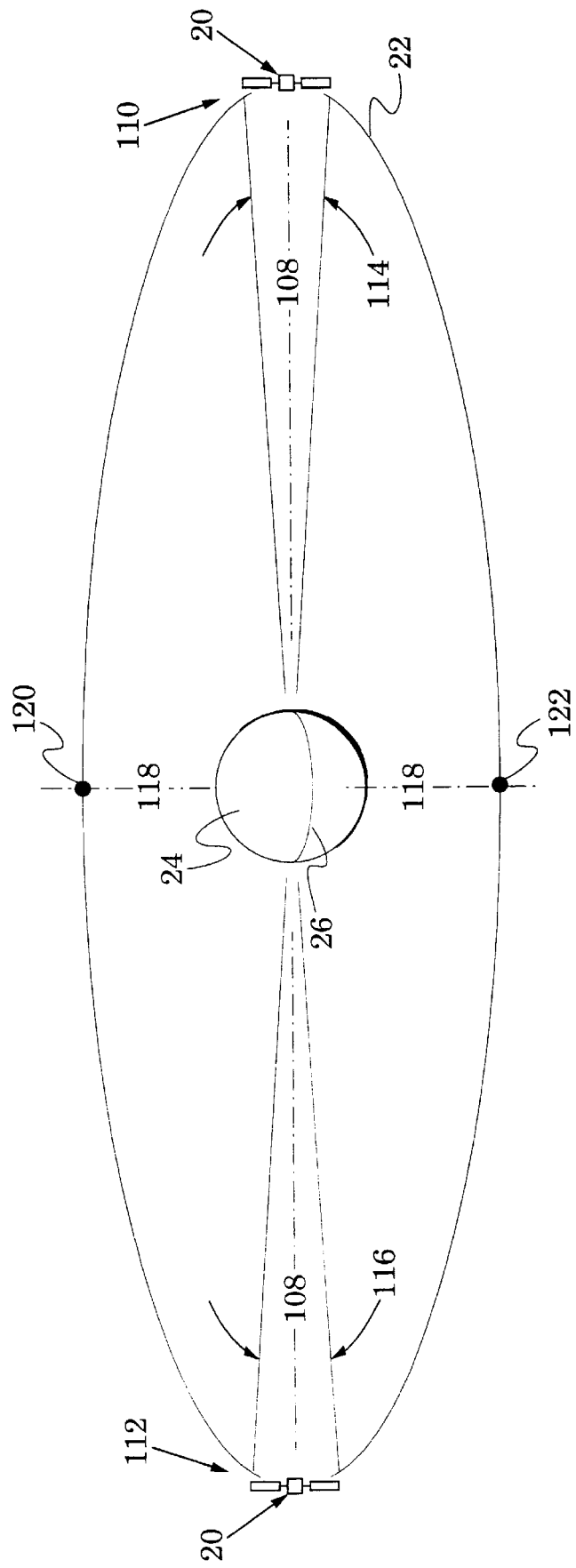
FIG. 5 is a view similar to FIG. 1 which illustrates exemplary operation of the thruster system of FIG. 2.
Figure 6:
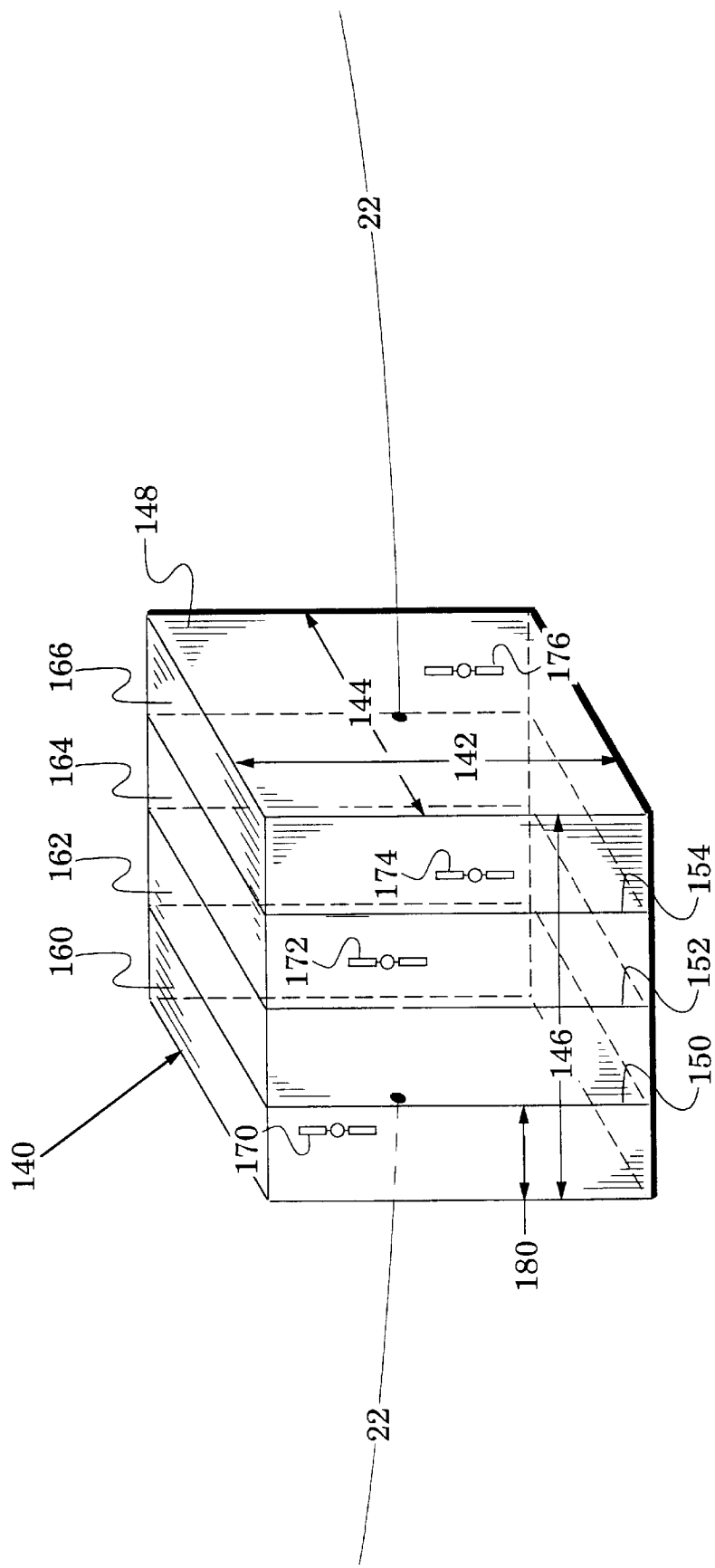
FIG. 6 is a perspective view of a geosynchronous orbital box with a plurality of satellites co-located in the orbital box in accordance with the present invention.

FIG. 6 illustrates a geosynchronous orbital box 140 which has a normal dimension 142, a radial dimension 144 and a tangential dimension 146. The orbital box 140 extends normally and radially about the GEO orbit 22 of FIGS. 1 and 5. For example, the GEO orbit 22 runs through the center of the east face 148 of the orbital box 140. Typically, the tangential dimension 146 of the orbital box 140 is on the order of 0.2° longitude or ~147 kilometers and the normal dimension 142 and radial dimension 144 are similar in magnitude.

The orbital box 140 is divided by a plurality of radially-oriented planes 150, 152 and 154 (equivalently, these planes are normally-oriented) to form a plurality of orbital sub-boxes 160, 162, 164 and 166. Satellites 170, 172, 174 and 176 are positioned respectively in sub-boxes 160, 162, 164 and 166. In accordance with the present invention, each of the satellites includes the thruster system 60 illustrated in FIGS. 2, 3 and 4 and the system is fired in a manner similar to that illustrated in FIG. 5.

Because of the orientation of the thrusters of the thruster system 60, they can generate, for each of the satellites 170, 172, 174 and 176, a required tangential velocity change $\Delta V_{DT}$ to control drift errors, a required normal velocity change $\Delta V_{IN}$ to control inclination errors, a required tangential velocity change $\Delta V_{ET}$ to control eccentricity errors along the axis 108 of FIG. 5 and a required radial velocity change $\Delta V_{ER}$ to control eccentricity errors along the axis 118 of FIG. 5. In operation, the normal, radial and tangential velocity changes are selected in FIG. 6 to sufficiently restrict satellite positional errors so that each of the satellites 170, 172, 174 and 176 is maintained in its respective one of the orbital sub-boxes 160, 162, 164 and 166.

Although the station keeping methods of the invention can be practiced with any thrusters (e.g., solid-propellant thrusters, mono-propellant thrusters such as hydrozene, and bi-propellant thrusters such as monomethyl hydrozene/nitrogen tetraoxide and oxygen/hydrogen) they are preferably practiced with ion-propulsion thrusters. The low thrust levels and high specific impulses (e.g., 2000–5000 seconds) of ion-propulsion thrusters facilitate a fine-grained and efficient control of satellite drift, eccentricity and inclination errors. With ion-propulsion thrusters, firings of the thrusters of the thruster system 60 may be performed frequently, e.g., daily, to facilitate precise control of satellite errors.

Because of their control characteristics, ion-propulsion thrusters are especially suited for restricting the position errors of the satellites 170, 172, 174 and 176 of FIG. 6 to small values (e.g., ~8 kilometers). Errors of this scale facilitate reduction of the tangential dimension 180 of the sub-boxes (e.g., sub-boxes 160, 162, 164 and 166) to a value, e.g. ~36.8 kilometers, which corresponds with four orbital sub-boxes and even to a value, e.g., ~14.7 kilometers, which corresponds to ten orbital sub-boxes.

The teachings of the invention can be extended to station keeping more than one satellite in each of the sub-boxes 160, 162, 164 and 166. For example, FIG. 7 is a tangential view of the east face 148 of the orbital box 140 which illustrates satellites 190 and 192 that are both maintained within the sub-box 166.

In operation, the thruster systems (60 in FIGS. 2, 3 and 4) of each of the satellites 190 and 192 are fired (i.e., the normal, radial and tangential velocity changes are appropriately selected) to rotate these satellites in a chosen one of a clockwise direction and a counterclockwise direction when the orbital sub-box 166 is viewed tangentially. In an exemplary rotation, satellites 190 and 192 are rotating counterclockwise in FIG. 7 as indicated by arrows on the satellite path 194. In addition, the thrusters are fired to space the satellites 190 and 192 in at least one of a radial direction and a normal direction from each other at all times. For example, the satellites 190 and 192 are spaced normally and radially throughout most of the path 194. However, there are some points along the path 194 where they are spaced radially but not normally and others where they are spaced normally but not radially.

Figure 7:
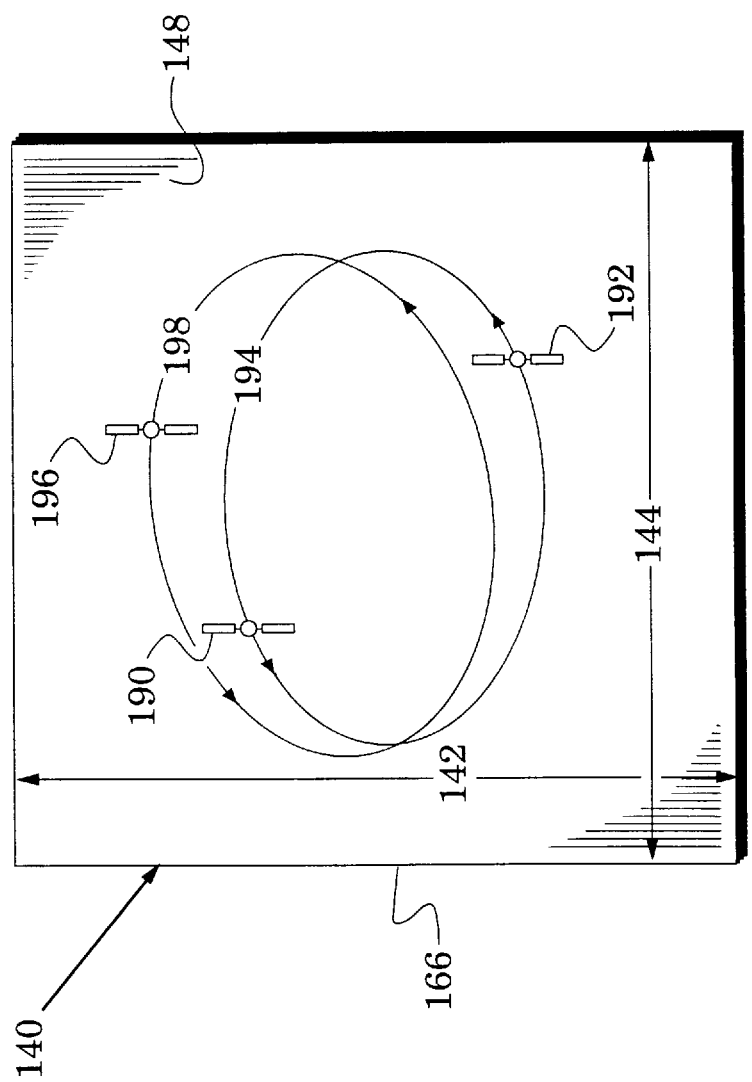
FIG. 7 is a tangential view of the geosynchronous orbital box of FIG. 6 which shows motion of co-located satellites in any orbital sub-box of the geosynchronous orbital box.

Although the satellites 190 and 192 are shown in FIG. 7 to follow the same counterclockwise path 194, they may follow different paths as long as their rotational direction is the same. For example, another satellite 196 is controlled by its thruster system (60 in FIG. 2) to rotate along a different counterclockwise path 198 in the sub-box 166 and to be spaced in at least one of a radial direction and a normal direction from each of the satellites 190 and 192 at all times. Because of the interaction of inclination and eccentricity errors, the paths 194 and 198, as projected in FIG. 7, will generally have an elliptical shape, the size and orientation of which are determined by the magnitudes of the errors.

An exemplary trio of satellites 190, 192 and 194 are shown in FIG. 7 to be positioned in the sub-box 166. Multiple satellites can be similarly positioned in each of the other sub-boxes 160, 162 and 164. The chosen rotational direction can differ among the sub-boxes but not within a sub-box.

The co-location methods of the invention are preferably practiced with the thruster system 60 of FIGS. 2, 3 and 4. In addition, ion-propulsion thrusters are preferably used because their low thrust facilitates maintaining the normal and radial spacing between satellites in the same sub-box. However, satellites with other thruster systems and thruster types can also be integrated into an orbital box with satellite's using the invention's co-location methods.

The teachings of the present invention adapt the precise thruster systems and methods of U.S. Pat. No. 5,443,231 to co-locate at least one satellite in each of a plurality of longitudinally-divided orbital sub-boxes. These methods simplify the ground operations that are required to achieve safe separation distances between co-located satellites.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of co-locating a plurality of satellites in a geosynchronous orbital box which has normal, radial and tangential dimensions wherein each of said satellites has a north-south axis, a center of mass and an anti-nadir face, said method comprising the steps of:

dividing said orbital box along at least one radially-oriented plane to form a plurality of orbital sub-boxes; and station keeping at least one of said satellites within each of said orbital sub-boxes by performing the following steps for each of said satellites:

a) positioning a northwest thruster, a northeast thruster, a southwest thruster and a southeast thruster in the regions respectively of a northwest, a northeast a southwest and a southeast corner of said anti-nadir face with each thruster directed at said center of mass;

b) canting said northwest thruster and said northeast thruster away from said anti-nadir face with respect to said north-south axis;

c) canting said southwest thruster and said southeast thruster away from said anti-nadir face with respect to said north-south axis;

d) slewing said northwest thruster and said southwest thruster in a west direction about said north-south axis;

e) slewing said northeast thruster and said southeast thruster in an east direction about said north-south axis;

f) firing said northeast thruster and said northwest thruster in the region of an orbit ascending node;

g) firing said southwest thruster and said southeast thruster in the region of an orbit descending node; and h) selecting a firing duration for each of said firing steps to be sufficient to maintain that satellite within its respective sub-box wherein said firing duration includes a required tangential velocity change $\Delta V_{DT}$ to control drift errors, a required normal velocity change $\Delta V_{IN}$ to control inclination errors, a required tangential velocity change $\Delta V_{ET}$ to control eccentricity errors along a first axis connecting said orbit ascending mode and said orbit descending node and a required radial velocity change $\Delta V_{ER}$ to control eccentricity errors along a second axis which is orthogonal to said first axis.

2. The method of claim 1, wherein said firing steps include the steps of said northwest thruster and said northeast thruster are respectively fired before and after said orbit ascending node; and said southwest thruster and said southeast thruster are respectively fired before and after said orbit descending node.

3. The method of claim 1, wherein said canting steps include the step of causing said northwest thruster and said northeast thruster to have substantially the same cant angle as said southwest thruster and said southeast thruster.

4. The method of claim 1, wherein said slewing steps include the step of causing said northwest thruster and said southwest thruster to have substantially the same slew angle as said northeast thruster and said southeast thruster.

5. The method of claim 1, wherein:

said canting steps include the step of causing said northwest thruster and said northeast thruster to have substantially the same cant angle $\theta$ as said southwest thruster and said southeast thruster;

said slewing steps include the step of causing said northwest thruster and said southwest thruster to have substantially the same slew angle $\alpha$ as said northeast thruster and said southeast thruster; and said selecting step includes the step of setting said firing duration equal to $$T_p \approx \frac{2}{\omega_\epsilon} \sin^{-1}\left[\frac{\omega_\epsilon}{2}\left(\frac{M\Delta V_N}{F\cos\theta}\right)\right]$$

which is expressed in terms of earth rate co $\omega_\epsilon$ spacecraft mass M, engine thrust F and a normal $\Delta V_N$ component given by a respective one of the following equations:

$$\Delta V_{Nnorthwest} = \frac{1}{2}\left\{\left[\frac{\Delta V_{DT} + \Delta V_{ET}}{2\tan\theta\tan\alpha}\right] + \left[\frac{\Delta V_{IN} - \Delta V_{ER}}{2\tan\theta}\right]\right\},$$

$$\Delta V_{Nnortheast} = \frac{1}{2}\left\{\left[\frac{\Delta V_{DT} + \Delta V_{ET}}{-2\tan\theta\tan\alpha}\right] + \left[\frac{\Delta V_{IN} - \Delta V_{ER}}{2\tan\theta}\right]\right\},$$

$$\Delta V_{Nsouthwest} = \frac{1}{2}\left\{\left[\frac{\Delta V_{DT} - \Delta V_{ET}}{2\tan\theta\tan\alpha}\right] + \left[\frac{\Delta V_{IN} + \Delta V_{ER}}{2\tan\theta}\right]\right\},$$

and $$\Delta V_{Nsoutheast} = \frac{1}{2}\left\{\left[\frac{\Delta V_{DT} - \Delta V_{ET}}{-2\tan\theta\tan\alpha}\right] + \left[\frac{\Delta V_{IN} + \Delta V_{ER}}{2\tan\theta}\right]\right\}.$$

6. The method of claim 1, wherein:

said station keeping step includes the step of maintaining two or more selected ones of said satellites in a respective one of said sub-boxes; and said selecting step is adapted to perform the following steps for said selected satellites in said respective sub-box:

a) directing said selected satellites to rotate in a chosen one of a clockwise direction and a counterclockwise direction when said respective sub-box is viewed tangentially; and b) spacing each of said selected satellites in at least one of a radial direction and a normal direction from others of said selected satellites.

7. The method of claim 1, further including the steps of:

for each of said satellites having a failed one of said northwest thruster and said southeast thruster;

a) shutting down the other of said northwest thruster and said southeast thruster; and b) firing both of said northeast thruster and said southwest thruster in the region of 0° right ascension; and for each of said satellites having a failed one of said northeast thruster and said southwest thruster;

a) shutting down the other of said northeast thruster and said southwest thruster; and b) firing both of said northwest thruster and said southeast thruster in the region of 180° right ascension.

8. The method of claim 1, further including the step of configuring said northwest thruster, said northeast thruster, said southwest thruster and said southeast thruster to each by an ion-propulsion thruster.

9. The method of claim 1, wherein said dividing step includes the step of causing at least one of said orbital sub-boxes to have a tangential dimension of substantially 36.8 kilometers.

10. The method of claim 1, wherein said dividing step includes the step of causing at least one of said orbital sub-boxes to have a tangential dimension of substantially 14.7 kilometers.

* * * * *